US007823151B2

(12) United States Patent
Seth et al.

(10) Patent No.: US 7,823,151 B2
(45) Date of Patent: Oct. 26, 2010

(54) METHOD OF ENSURING THE INTEGRITY OF TLB ENTRIES AFTER CHANGING THE TRANSLATION MODE OF A VIRTUALIZED OPERATING SYSTEM WITHOUT REQUIRING A FLUSH OF THE TLB

(75) Inventors: Rohit Seth, Santa Clara, CA (US); Arun Sharma, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 1531 days.

(21) Appl. No.: 11/153,573

(22) Filed: Jun. 15, 2005

(65) Prior Publication Data

US 2006/0288189 A1     Dec. 21, 2006

(51) Int. Cl.
*G06F 9/455*     (2006.01)
*G06F 9/46*     (2006.01)

(52) U.S. Cl. ............................................. 718/1; 718/108
(58) Field of Classification Search ....................... 718/1
See application file for complete search history.

(56) References Cited

U.S. PATENT DOCUMENTS

| | | | | |
|---|---|---|---|---|
| 5,940,872 | A * | 8/1999 | Hammond et al. | 711/207 |
| 6,021,469 | A * | 2/2000 | Tremblay et al. | 711/125 |
| 6,189,074 | B1 * | 2/2001 | Pedneau | 711/139 |
| 6,356,989 | B1 * | 3/2002 | Hays et al. | 711/205 |
| 6,510,508 | B1 | 1/2003 | Zuraski, Jr. et al. | |
| 2003/0037089 | A1 * | 2/2003 | Cota-Robles et al. | 709/1 |

OTHER PUBLICATIONS

Free Software Magazine, Issue 5, "Xen, the virtual machine monitor—The Art of Virtualization," 5 pages, Jun. 2005.
Prentice Hall PTR, Stephane Eranian & David Mosberger, "Virtual Memory in the IA-64 Linux Kernel," 49 pages, Nov. 8, 2002.
Intel Technology Journal, Darrell Boggs, Aravindh Baktha, Jason Hawkins, Deborah T. Marr, J. Alan Miller, Patrice Roussel, Ronak Singhal, Bret Toll and K.S. Venkatraman, "The Microarchitecture of the Intel Pentium 4 Processor on 90nm Technology," 19 pages, Feb. 18, 2004.
Intel Solutions White Paper, "Enhanced Virtualization on Intel Architecture-based Servers," 9 pages, Mar. 2005.

* cited by examiner

*Primary Examiner*—Meng-Ai An
*Assistant Examiner*—Gregory A Kessler
(74) *Attorney, Agent, or Firm*—Hanley, Flight & Zimmerman, LLC.

(57) ABSTRACT

Systems and methods are disclosed to support partial physical addressing modes on a virtual machine. An example method disclosed herein identifies a change of a first translation mode to a second translation mode on a host hardware platform, the host hardware platform including a processor, the processor further including region registers; identifies an address as cacheable or non-cacheable; saves contents of the region registers for the first translation mode to processor memory; updates content of the region registers corresponding to the second translation mode; identifies a change of the second translation mode to the first translation mode; and populates the region registers with the contents of the saved region registers corresponding to the first translation mode.

20 Claims, 5 Drawing Sheets

-- PRIOR ART --

METHOD OF ENSURING THE INTEGRITY OF TLB ENTRIES AFTER CHANGING THE TRANSLATION MODE OF A VIRTUALIZED OPERATING SYSTEM WITHOUT REQUIRING A FLUSH OF THE TLB

FIELD OF THE DISCLOSURE

This disclosure relates generally to processor management, and, more particularly, to systems and methods to support partial physical addressing modes on a virtual machine.

BACKGROUND

Operating systems typically expect complete and direct control of hardware and system resources. As such, the operating systems implement policies to manage these resources to allow execution of various user applications. Frequently, a single application is dedicated to a single platform of hardware and system resources (e.g., industry standard servers) such that the application can not conflict with other applications, or vice versa. Additionally, in the event of the application failing, a separate backup platform of hardware and system resources may then be employed to execute the application. Other benefits to maintaining separate platforms of hardware include keeping various applications secure from one another. In such a case, even if one application contains a security flaw, potentially rendering the hardware and system resources vulnerable to attack, the attacker may not access additional data or services of that breached platform because there is only a single application executing on those resources.

Recently, there has been an increased interest in consolidating applications on a single server because, despite the low cost of such hardware, the cost of maintaining that hardware is high. Additionally, dedicating a single application to one server results in a significant waste of processing resources. Virtualization of processor hardware (e.g., industry standard servers) allows multiple instances of operating systems to run on a single system.

A virtualized computing environment includes one or more virtual machines (VM) that further include all the necessary hardware and system resources (processors, memory, disk, network devices, and other peripherals) that an operating system expects. A virtual machine monitor (VMM) is software that is operating between the hardware and as many VMs as required to service the operating systems. For each instance of an operating system, referred to as a guest operating system, the VMM creates a VM. Therefore, if a particular application in a guest operating system fails or crashes, it will have no effect on other operating systems operating on separate VMs of the virtualized computing environment. An alternate VM may, upon detection of the failure, operate as a fail-over server and execute the application, negating any need to cycle power for the system resources executing the failed application.

Because operating systems typically expect direct control and access to system resources, multiple operating systems executing on a single hardware platform could naturally result in conflict. Consequently, each operating system, and corresponding application(s) executing within the operating system, will typically execute unmodified and unaware that it has no direct access to the system resources. In such cases, the VMM isolates execution of each VM, and allocates resources for each VM in physical memory that does not overlap with other operating systems or applications concurrently using the underlying platform of hardware resources.

Processors may support a variety of modes ranging from full physical to full virtual mode, with various partial transition modes in between. An operating system may set physical or virtual modes independently for data, register backing store, and instructions. A transition occurs when one of these modes changes from physical to virtual, or vice versa. After a transition, care must be taken to maintain address integrity that has been designated as cacheable or non-cacheable address space. If an address has been designated as cacheable, it must not be changed to non-cacheable, or vice versa. Software based virtualization solutions today require complex workarounds to maintain address integrity. The VMM monitors operations of the operating system during runtime and takes control when the operating system attempts to access privileged platform resources. Upon completion of the operating system privileged process, the VMM returns control back to the operating system.

Such monitoring and processing in software greatly impacts processor performance. Most processors include a Translation Lookaside Buffer (TLB) to speed-up virtual to physical address translations. A TLB is a small amount of memory located within a processor that may store virtual to physical address translations. Such translations may be stored on a page and the TLB will typically store a small number of virtual address translations from the page that were most recently used. When an operating system or application attempts a memory access, it may issue a virtual address. The TLB is searched for that virtual address and, if found, the corresponding physical address may then be used to quickly access physical memory. If the virtual address is not found, however, the processor must translate the virtual address via a page table walk, thereby consuming significant processor resources.

The TLB may also fail to contain useful virtual addresses (and corresponding physical addresses) if it has been flushed. A TLB flush occurs when an application or operating system changes modes (e.g., from virtual to physical mode), sometimes referred to as a context switch. One particular concern leading to the TLB flush is to prevent any overlap between TLB entries that are used for guest physical addressing and entries that are used for guest virtual addressing. Effectively ensuring that no such overlap occurs during mode changes, while preserving useful TLB entries, remains an open problem.

DETAILED DESCRIPTION

Figure 1:
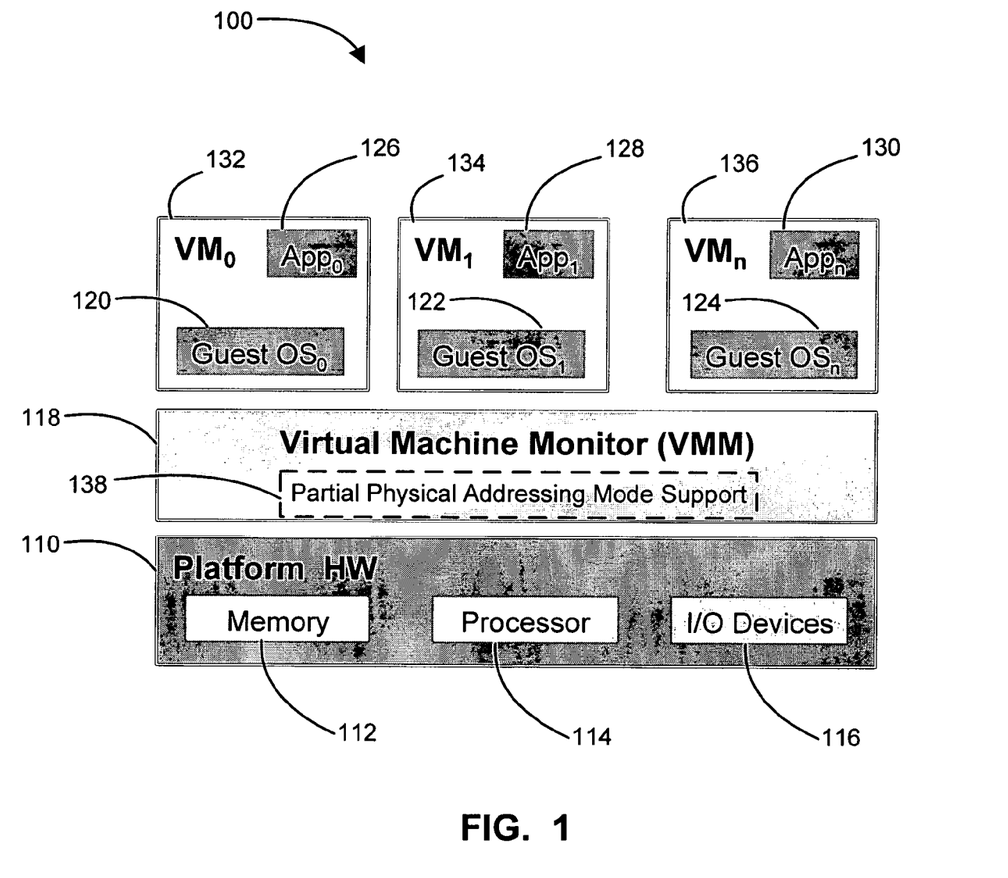
FIG. 1 is a diagram illustrating an example virtualized environment with partial physical addressing mode support.

As mentioned above, managing hardware resources for a guest operating system (OS) in a virtualized environment typically includes handling memory access attempts. An exemplary virtualized environment 100 is shown in FIG. 1. A common platform of hardware 110 may include, among other things, memory 112, a processor 114, and I/O devices 116. A Virtual Machine Monitor (VMM) 118 is a layer of system software executing on the processor 114 that enables flexible and secure consolidation of multiple operating systems (OS) 120, 122, 124 and applications 126, 128, 130 onto a single platform of hardware 110. For each instance of a guest OS 120, 122, 124 the VMM 118 will create a virtual machine (VM) 132, 134, 136 for the guest OS. A VM 132, 134, 136 includes all the hardware and system resources (processors, memory, disk, network devices, and other peripherals) expected by the guest OS 120, 122, 124. From the VMM 118 perspective, these hardware and system resources are "virtualized." On the other hand, from the OS perspective, the OS has direct and unfettered access to any and all resources it requires for execution. However, in a virtualized environment, virtualized software (e.g., OSs and applications) will continue to execute on the processor unmodified. Interruptions from the processor, for example, as a result of a guest OS address access request to memory, will be handled by the VMM 118. The virtualized environment 100 may further operate in a shared policy in which the platform hardware 110 is shared (time multiplexed) between various VMMs 132, 134, 136.

Because every VM shares resources of the platform hardware 110, and because none of the OSs executing within each VM is aware of other OSs, the VMM 118 must prevent each OS from having direct physical address access for the fear that such access will impair execution of other OSs. As such, the VMM 118 emulates a complete hardware environment, isolates execution of each VM for security, and allocates appropriate platform resources to optimize performance. The OSs may operate in virtual mode, which requires translation of virtual addresses to physical addresses. The OS may also operate in physical mode, which requires no translation. Of course, in a virtualized environment the processor 114 is in full translation (virtual) mode, but the VMM allows the OS to believe that it actually has direct access to physical addresses. A Translation Lookaside Buffer (TLB) may assist processor performance by storing virtual to physical address translations direct in processor memory for rapid access. As discussed earlier, if the OS changes modes from virtual to full or partial physical mode, the TLB may be flushed, thereby eliminating performance advantages realized by the TLB.

A Partial Physical Addressing Mode Support (PAS) 138 operates with the VMM 118 to identify translation mode changes, identify address types of OS access attempts, and isolate TLB entries used for guest physical or guest virtual modes. As a result of the PAS 138, TLB flushes are unnecessary when a mode change occurs, as will be discussed in further detail below.

Memory access attempts are initiated by the guest OS and may expect to have direct access to physical address space. Because a guest OS is typically unaware that it is executing in a virtualized environment, the VMM must keep the guest OS under the illusion that it has such direct access while 'trapping' attempts to access physical memory. Upon a physical access attempt, the VMM interprets the guest OS access request, translates a virtual address to a physical address, and then returns control back to the OS when finished.

Performing address translations consumes a great amount of Computer Processing Unit (CPU) cycles. A virtual address must be translated to the corresponding physical address through a page table walk. Page tables may have many sub-pages, thus every virtual address may need a great number of CPU cycles to navigate to the appropriate physical address.

Figure 2:
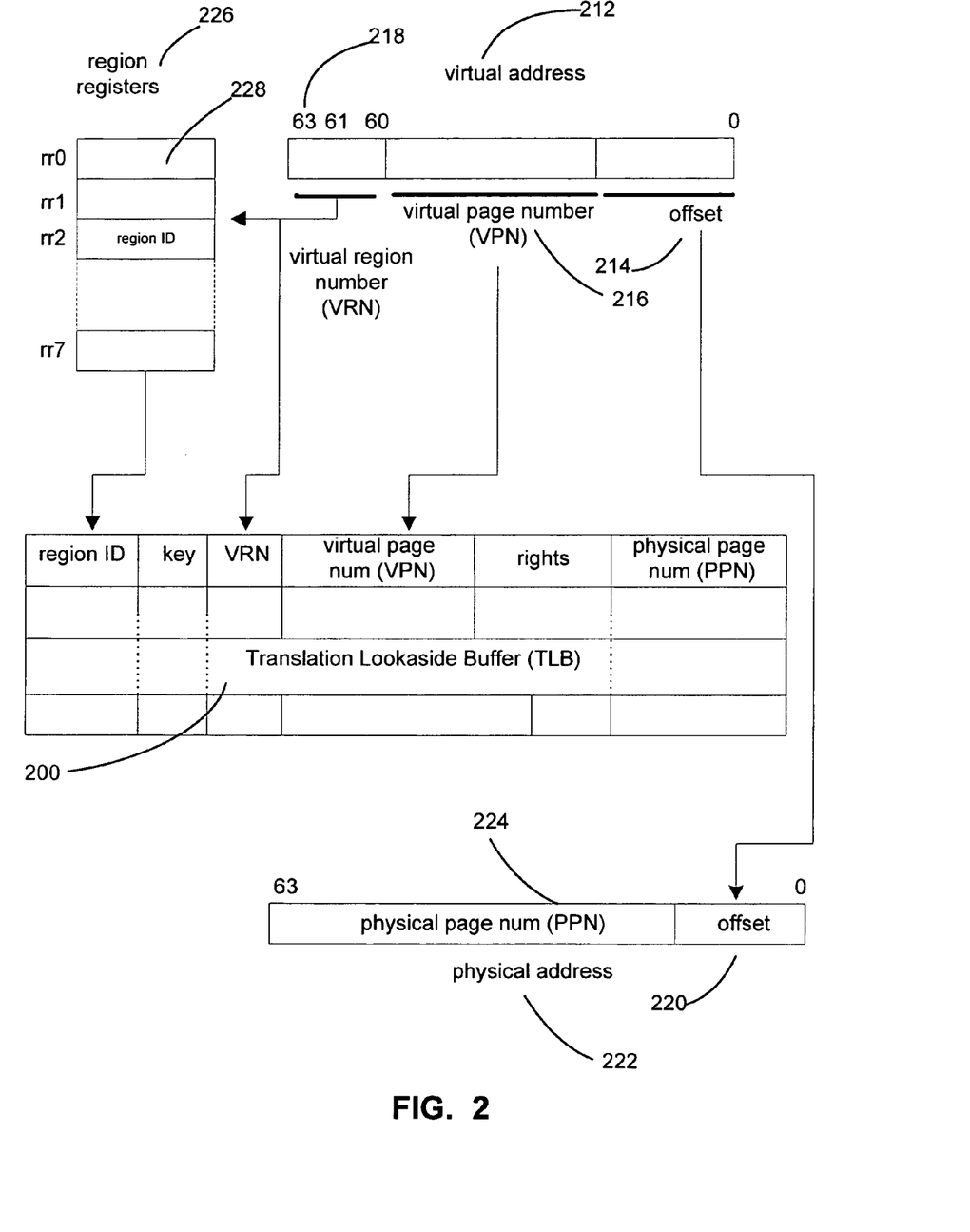
FIG. 2 is a diagram illustrating an example translation lookaside buffer.

However, the TLB 200, as shown in FIG. 2, may speed-up this process significantly. The TLB 200 is a small amount of memory located within a processor that may store virtual to physical address translations. Because direct physical address access is prohibited by an OS in a virtualized environment, a virtual address is used. The virtual address may be translated to point to a proper physical address that has no overlap or conflict with other OSs and applications executing in the virtualized environment. A physical address, unlike a virtual address, is a location of physical memory, such as memory located on RAM or ROM, for example. The virtual address 212 may be, for example, 64 bits wide and contain offset bits 214, a virtual page number 216 (VPN), and a virtual region number 218 (VRN). The offset bits 214 pass unmodified from the virtual address 212 to offset bits 220 of a corresponding physical address 222. However, prior to stepping through the TLB 200, a physical page number 224 (PPN) is still unknown.

The translation mode of the executing process (e.g., guest OS) establishes the VRN 218 of virtual address bits 61, 62 and 63. For example, many processors support full physical mode, full virtual mode, as well as many partial translation modes. Each of these modes may be enabled or disabled separately for data, instruction and register stack using 3 different bits in a system state. The system state is typically defined by a processor status register (PSR). If the PSR data address translation bit is set to 1, then virtual addresses are translated. If the PSR data address translation bit is set to 0, then data accesses use (direct) physical addressing. Similarly, a register stack translation bit and an instruction address translation bit function in the same way. These three bits, each having one of two possible states, result in eight different translation modes and are further represented by the VRN. All three bits equal to zero represent full physical mode, while all three bits equal to one equal full virtual mode. Despite the guest OS expectations regarding the processor mode being full physical, full virtual, or any permutation therein, the processor always has translation turned on in a virtualized environment. Generally speaking, the VMM allows the guest OS to believe (expect) that it actually has direct physical address access, even though the VMM traps such an attempt and translates the address for the OS.

Associated with each virtual address 212 are eight virtual regions selected by the VRN 218. Associated with each virtual region is a region register 226 that specifies a region identifier 228 ("region ID"—a unique address space number) for the region. Upon a memory reference, the VRN 218 selects a region identifier 228 from 1 of the 8 region registers 226 and the TLB 200 is searched for a translation entry having a matching VPN 216 and region ID 228 value. If a matching translation entry is found, the entry's PPN 224 is concatenated with the page offset bits 220 to form the physical address 222. However, if the translation is not found in the TLB 200, the processor raises a TLB miss fault to request that the operating system supply the translation. Additionally, for traditional TLB implementations, mode switches (e.g., when a process switches translation modes from virtual to physical, or vice versa) result in the removal of all translations stored in the TLB 200, known as a TLB flush. The TLB 200 may be flushed because an address translation corresponding to the previous translation mode may no longer point to the correct physical address. New TLB entries require a burdensome page table walk that consumes CPU cycles and causes latency.

Mode switching may result in cacheable address access attempts for memory designated as non-cacheable, or non-cacheable address access attempts for memory designated as cacheable. On Intel® Itanium® processors, for example, physical accesses have the highest implemented bit set to zero for cacheable accesses, and set to one for non-cacheable accesses. Once memory is designated as either cacheable or non-cacheable, subsequent switches should not occur. Generally speaking, cacheable memory is very high performance while non-cacheable memory is used with disk controllers, network card controllers, or various I/O related functions that do not require high speed/performance.

Figure 3:
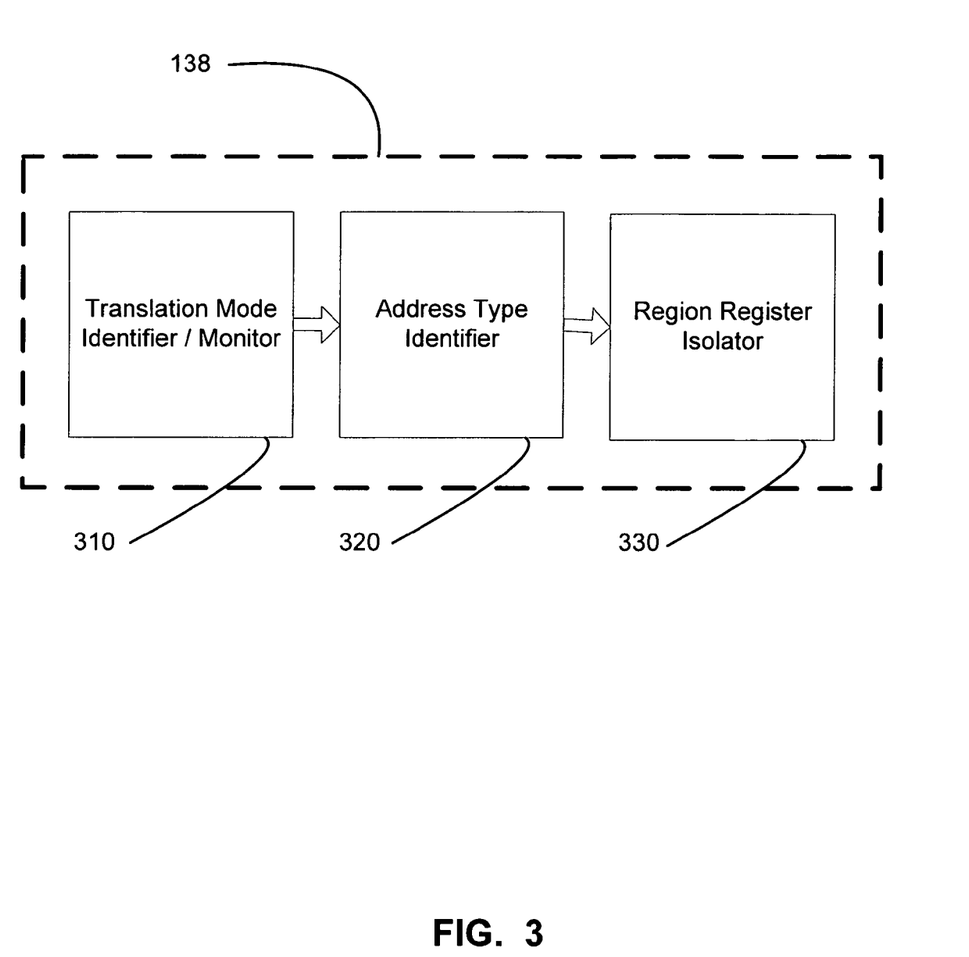
FIG. 3 is a more detailed schematic illustration of an example apparatus for partial physical addressing mode support of the example virtualized environment of FIG. 1.

FIG. 3 is a more detailed schematic illustration of the Partial Physical Addressing Mode Support (PAS) 138 of FIG. 1. For the purpose of identifying when a guest operating system switches to an alternate translation mode, the apparatus is provided with a translation mode monitor 310. The translation mode monitor tracks the PSR, or any other execution environment indicator, for changes in how any one of data, register stack, or instructions are translated. The PSR of the Intel® Itanium® Processor, for example, includes a data address translation bit (psr.dt—bit 17), a register stack translation bit (psr.rt—bit 27), and an instruction address translation bit (psr.it—bit 36). If any of these bits are set to zero, then corresponding accesses use physical addressing. If any of these bits are set to one, then corresponding accesses use virtual addressing. The translation mode monitor 310 identifies a transition of any one of these three bits to signal a change in the processor translation mode.

In order to identify whether an address is cacheable or non-cacheable, the PAS 138 is further provided with an address type identifier 320. As will be appreciated by persons of ordinary skill in the art, the address type identifier 320 may identify cacheable or non-cacheable in any number of ways. Physical accesses for the Intel® Itanium® processor, for example, has its highest implemented bit set to zero for cacheable accesses and its highest implemented bit set to one for non-cacheable accesses. The address type identifier 320 may monitor this bit to establish whether the address is of type cacheable or non-cacheable.

In order to maintain separation between cacheable and non-cacheable addresses, the PAS 138 is further provided with a region register isolator 330. The region register isolator 330 reserves two region IDs 228 for physical mode emulation, one for cacheable addresses and one for non-cacheable addresses. These two region IDs, for example, region ID "A" and region ID "B" are non-overlapping to avoid TLB flushes for entries used for guest physical and guest virtual accesses. As such, any guest OS operating in partial physical mode will have virtual and physical mode accesses going strictly to different regions.

Figure 4:
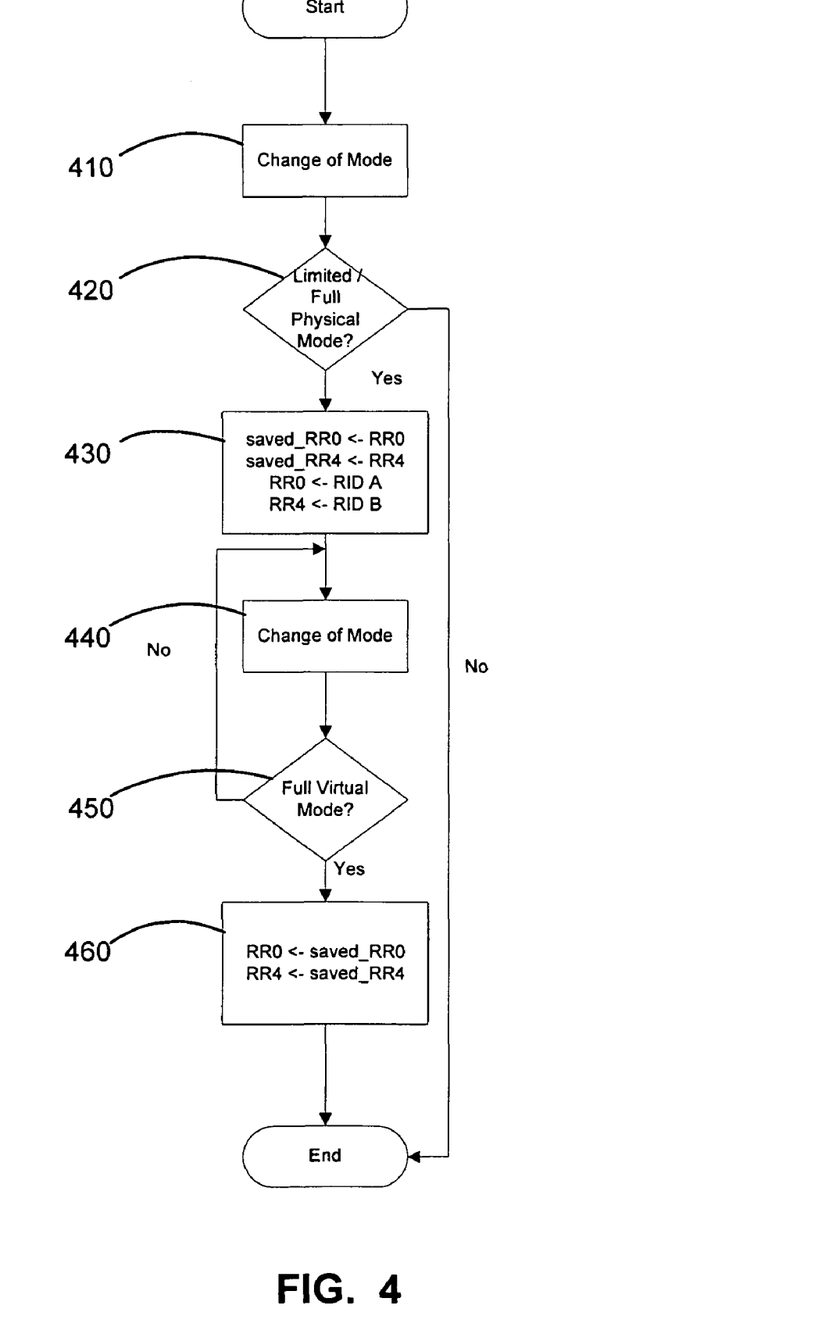
FIG. 4 is a flow chart illustrating example machine readable instructions for implementing the example apparatus to support partial physical addressing modes on a virtual machine shown in FIG. 3.

A flowchart representative of example machine readable instructions for implementing the PAS 138 of FIGS. 1 and 3 is shown in FIG. 4. In this example, the machine readable instructions comprise a program for execution by a processor such as the processor 510 shown in the example computer 500 discussed below in connection with FIG. 5. The program may be embodied in software stored on a tangible medium such as a CD-ROM, a floppy disk, a hard drive, a digital versatile disk (DVD), or a memory associated with the processor 510. In particular, the method may be executed on the processor inside a piece of software called a hypervisor. One example of the hypervisor is Xen®, a VMM that may securely execute multiple VMs, each running their own OS on a single platform of hardware and system resources.

The program of FIG. 4 begins at block 410 where the translation mode monitor 310 identifies whether a change of any one of the PSR registers corresponding to data, register stack and instruction. Additionally, the VMM can arrange for access to psr.dt/it/rt bits to trap changes using a virtualization fault. If the mode change at block 420 is one of full or partial physical mode, then the current contents of region registers 226 zero and four (RR0 and RR4) are saved to memory before switching to an alternate mode. Again, the region registers 226 zero and four correspond to physical addresses designated as cacheable or non-cacheable, respectively. Such identification is performed by the address type identifier 320 shown in FIG. 3. Then, RR0 and RR4 are populated with the contents of region ID "A" and region ID "B" (RID A and RID B), corresponding to the two separate regions for cacheable and non-cacheable memory at block 430. Although the guest OS may believe that it is directly accessing physical memory, the processor hardware translates such a request to point to an appropriate location of physical memory as not to conflict with other applications or OSs in the virtualized environment.

Again, the translation mode monitor 310 identifies whether a change of the PSR registers is such that the translation mode is full virtual at blocks 440 and 450. If not, the translation mode monitor 310 continues to monitor the PSR bits, otherwise the operation of block 430 is essentially undone at block 460. Rather than require a TLB flush when switching between guest physical and virtual modes, as is performed with traditional TLB implementations, the previously saved contents of RR0 and RR4 are reloaded. The hypervisor may additionally write to appropriate bits in the PSR to allow the guest OS to believe that any particular translation mode exists, despite the fact that processor virtualization is always on.

Figure 5:
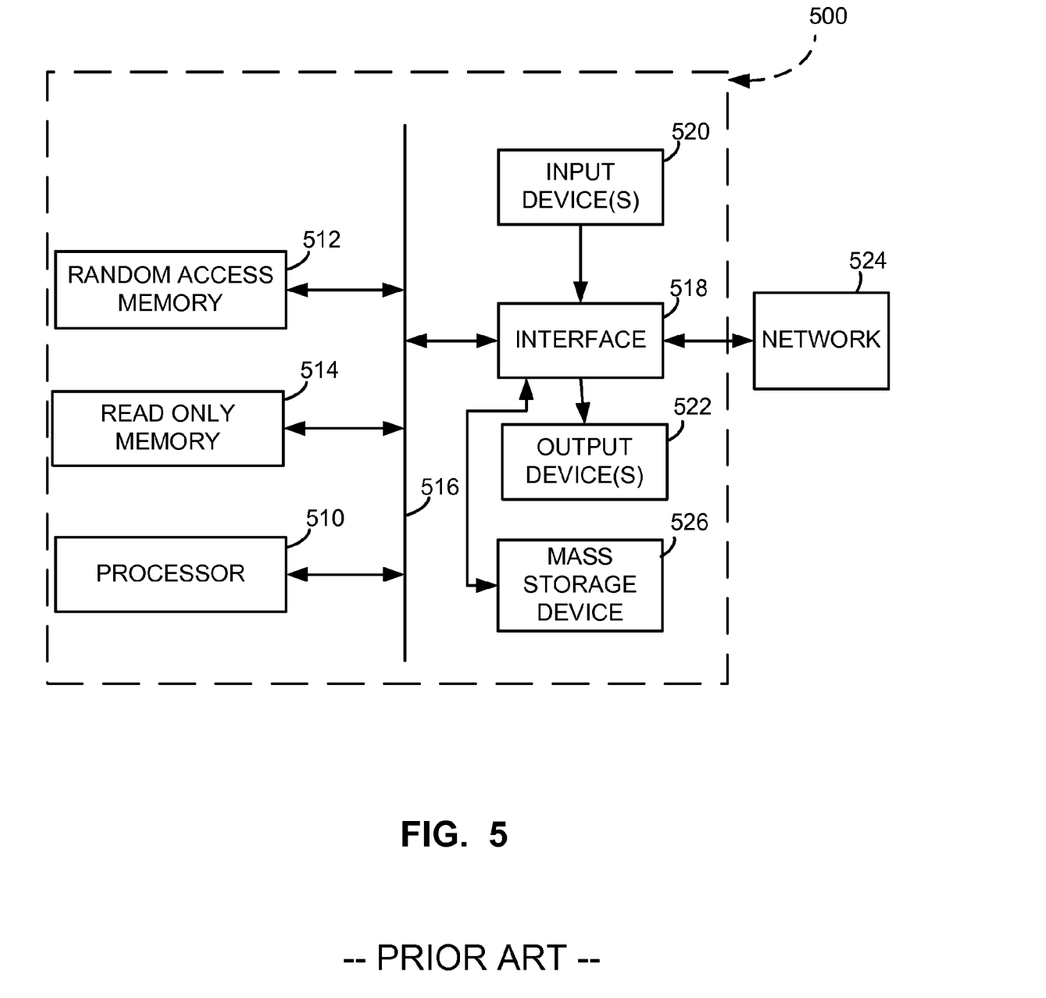
FIG. 5 is a schematic illustration of an example computer which may execute the programs of FIG. 4 to implement the apparatus of FIG. 3.

FIG. 5 is a block diagram of an example computer 500 capable of implementing the apparatus and methods disclosed herein. The computer 500 can be, for example, a server, a personal computer, a personal digital assistant (PDA), or any other type of computing device.

The system 500 of the instant example includes a processor 510. For example, the processor 510 can be implemented by one or more Intel® microprocessors from the Pentium® family, the Itanium® family, the XScale® family, or the Centrino™ family. Of course, other processors from other families are also appropriate.

The processor 510 is in communication with a main memory including a volatile memory 512 and a non-volatile memory 514 via a bus 516. The volatile memory 512 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 514 may be implemented by flash memory and/or any other desired type of memory device. Access to the main memory 512, 514 is typically controlled by a memory controller (not shown) in a conventional manner.

The computer 500 also includes a conventional interface circuit 518. The interface circuit 518 may be implemented by any type of well known interface standard, such as an Ethernet interface, a universal serial bus (USB), and/or a third generation input/output (3GIO) interface.

One or more input devices 520 are connected to the interface circuit 518. The input device(s) 520 permit a user to enter data and commands into the processor 510. The input device(s) can be implemented by, for example, a keyboard, a mouse, a touch screen, a track-pad, a trackball, isopoint and/or a voice recognition system.

One or more output devices 522 are also connected to the interface circuit 518. The output devices 522 can be implemented, for example, by display devices (e.g., a liquid crystal display, a cathode ray tube display (CRT), a printer and/or speakers). The interface circuit 518, thus, typically includes a graphics driver card.

The interface circuit 518 also includes a communication device such as a modem or network interface card to facilitate exchange of data with external computers via a network 524 (e.g., an Ethernet connection, a digital subscriber line (DSL), a telephone line, coaxial cable, a cellular telephone system, etc.).

The computer 500 also includes one or more mass storage devices 426 for storing software and data. Examples of such mass storage devices 526 include floppy disk drives, hard drive disks, compact disk drives and digital versatile disk (DVD) drives.

As an alternative to implementing the methods and/or apparatus described herein in a system such as the device of FIG. 5, the methods and/or apparatus described herein may alternatively be embedded in a structure such as processor and/or an ASIC (application specific integrated circuit).

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of supporting addressing modes mode changes comprising:
    identifying a first translation mode associated with a virtualized operating system based on a first virtual region number of a virtual address;
    identifying a translation mode change of the virtualized operating system from the first translation mode to a second translation mode on a host hardware platform based on comparing the first virtual region number to a second virtual region number in the virtual address, the host hardware platform including a processor, the processor further including a first region register associated with the first translation mode;
    saving contents of the first region register to a processor memory;
    updating contents of the first region register corresponding to the second translation mode to be used by the host hardware platform during the second translation mode;
    bypassing a flush of a translation lookaside buffer in response to identifying the virtualized operating system changing back from the second translation mode to the first translation mode via identifying the second virtual region number replaced by the first virtual region number in the virtual address; and
    populating the first region register with the contents retrieved from the processor memory that corresponds to the first translation mode.

2. A method as defined in claim 1 wherein identifying a change of a first translation mode change from the first mode to the second mode comprises monitoring an execution environment of an operating system.

3. A method as defined in claim 2 wherein monitoring an execution environment of an operating system comprises monitoring a processor status register.

4. A method as defined in claim 1 further comprising identifying an address as cacheable or non-cacheable by monitoring an address type identification bit.

5. A method as defined in claim 1 wherein saving contents of the first region register comprises saving region identifiers corresponding to cacheable addresses from region register zero to processor memory, and saving region identifiers corresponding to non-cacheable addresses from region register four to processor memory.

6. A method as defined in claim 5 wherein region register zero and region register four are populated with contents of a region register for cacheable addresses and a region register for non-cacheable addresses, respectively.

7. An article of manufacture storing machine readable instructions which, when executed, cause a machine to:
    identify a first translation mode associated with a virtualized operating system based on a virtual region number of a virtual address;
    identify a translation mode change of the virtualized operating system from the first translation mode to a second translation mode on a host hardware platform based on comparing the first virtual region number to a second virtual region number in the virtual address, the host hardware platform including a processor, the processor further including a first region register associated with the first translation mode;
    save contents of the first region register to a processor memory;
    update contents of the first region register corresponding to the second translation mode to be used by the host hardware platform during the second translation mode;
    bypass a flush of a translation lookaside buffer in response to identifying the virtualized operating system changing back from the second translation mode to the first translation mode via identifying the second virtual region number replaced by the first virtual region number in the virtual address; and
    populate the first region register with the contents retrieved from the processor memory that corresponds to the first translation mode.

8. An article of manufacture as defined in claim 7 wherein the host hardware platform comprises an operating system, the operating system further comprising an execution environment.

9. An article of manufacture as defined in claim 8 wherein the execution environment comprises a processor status register.

10. An article of manufacture as defined in claim 7 comprising an address type identification bit that identifies the address as cacheable or non-cacheable.

11. An article of manufacture as defined in claim 7 wherein the machine readable instructions cause the machine to save contents of the first region register by:
    saving region identifiers corresponding to cacheable addresses from a region register zero to processor memory, and saving region identifiers corresponding to non-cacheable addresses from a region register four to processor memory.

12. An article of manufacture as defined in claim 11 wherein the machine readable instructions cause the machine to populate the region register zero and the region register four with contents of a region register for cacheable addresses and a region register for non-cacheable addresses, respectively.

13. An apparatus to support addressing mode changes comprising:
    a transition mode identifier to monitor an execution environment of a virtualized operating system to identify a first translation mode of the virtualized operating system based on a virtual region number of a virtual address, and to identify a translation mode change of the virtualized operating system from the first translation mode to a second translation mode based on comparing the first virtual region number to a second virtual region number in the virtual address;

a host hardware platform, the host hardware platform including a processor, the processor further including a first region register associated with the first translation mode;

a region register isolator to save contents of the first region register to a memory, and load the first region register with information associated with the second translation mode to be used by the host hardware platform during the second translation mode; and a physical addressing mode support to bypass a flush of a translation lookaside buffer in response to identifying the virtualized operating system changing back from the second translation mode to the first translation mode via identifying the second virtual region number replaced by the first virtual region number in the virtual address.

14. An apparatus as defined in claim 13 wherein the transition mode identifier monitors a virtual region number via a physical address mode support.

15. An apparatus as defined in claim 14 wherein the virtual region number comprises status bits for at least one of a data transition mode, a register backing store transition mode, and an instruction transition mode.

16. An apparatus as defined in claim 13 further comprising a region register zero and a region register four.

17. An apparatus as defined in claim 16 wherein the region register zero corresponds to cacheable physical addresses and the region register four corresponds to non-cacheable physical addresses.

18. An apparatus as defined in claim 13 further comprising an address type identifier to monitor a highest implemented processor bit to determine address space as either cacheable or non-cacheable.

19. An apparatus as defined in claim 13 wherein the region register isolator reserves a region ID for cacheable addresses and a region ID for non-cacheable addresses.

20. An apparatus as defined in claim 19 wherein the region IDs are non-overlapping.

* * * * *

UNITED STATES PATENT AND TRADEMARK OFFICE
CERTIFICATE OF CORRECTION

PATENT NO.        : 7,823,151 B2
APPLICATION NO.   : 11/153573
DATED             : October 26, 2010
INVENTOR(S)       : Seth et al.

It is certified that error appears in the above-identified patent and that said Letters Patent is hereby corrected as shown below:

Column 7, line 24 (claim 1): after "addressing" and before "mode" delete "modes";

Column 7, line 53 (claim 2): after "a" and before "translation" delete "first";

Signed and Sealed this

Twenty-first Day of December, 2010

David J. Kappos
*Director of the United States Patent and Trademark Office*